Feb. 16, 1937.                H. J. KEMP                 2,071,037
             FERTILIZER AND SEED FEED ATTACHMENT FOR DRILLS
                     Filed May 7, 1932           4 Sheets-Sheet 1

INVENTOR
Harold J. Kemp
By Junius Haskett
his Attorney

Feb. 16, 1937.  H. J. KEMP  2,071,037
FERTILIZER AND SEED FEED ATTACHMENT FOR DRILLS
Filed May 7, 1932  4 Sheets-Sheet 2
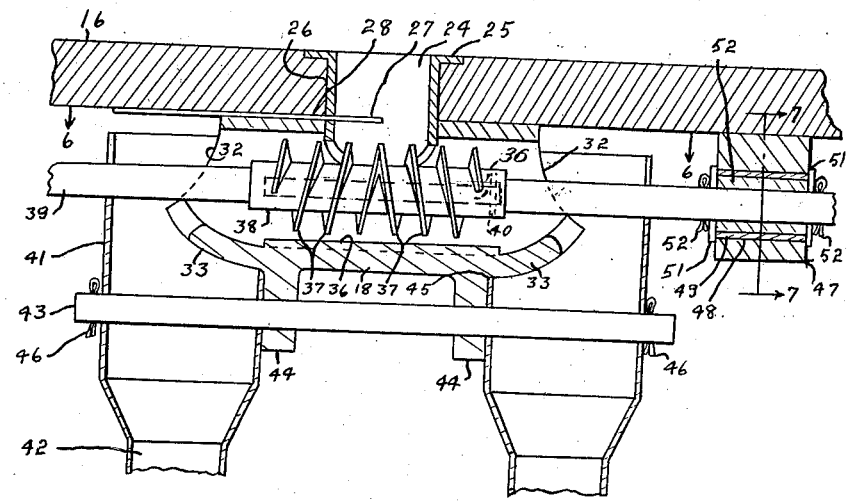
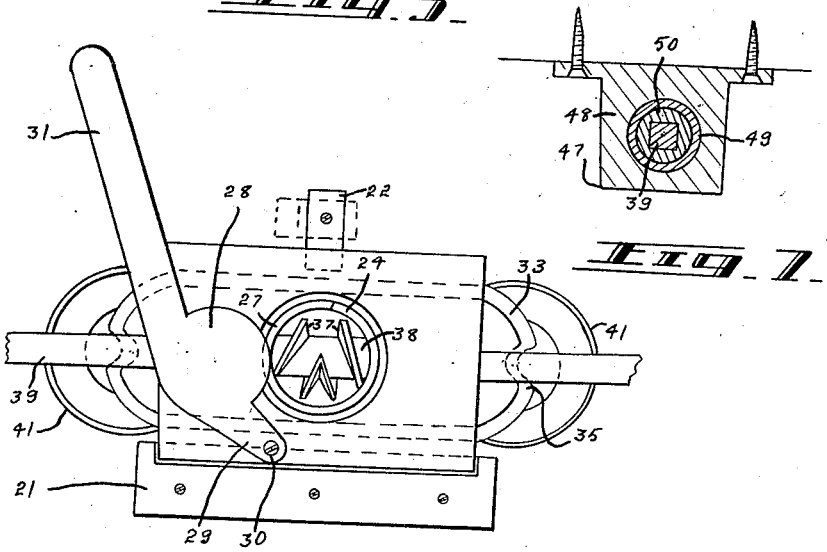
INVENTOR
Hald J. Kemp
By
his Attorney

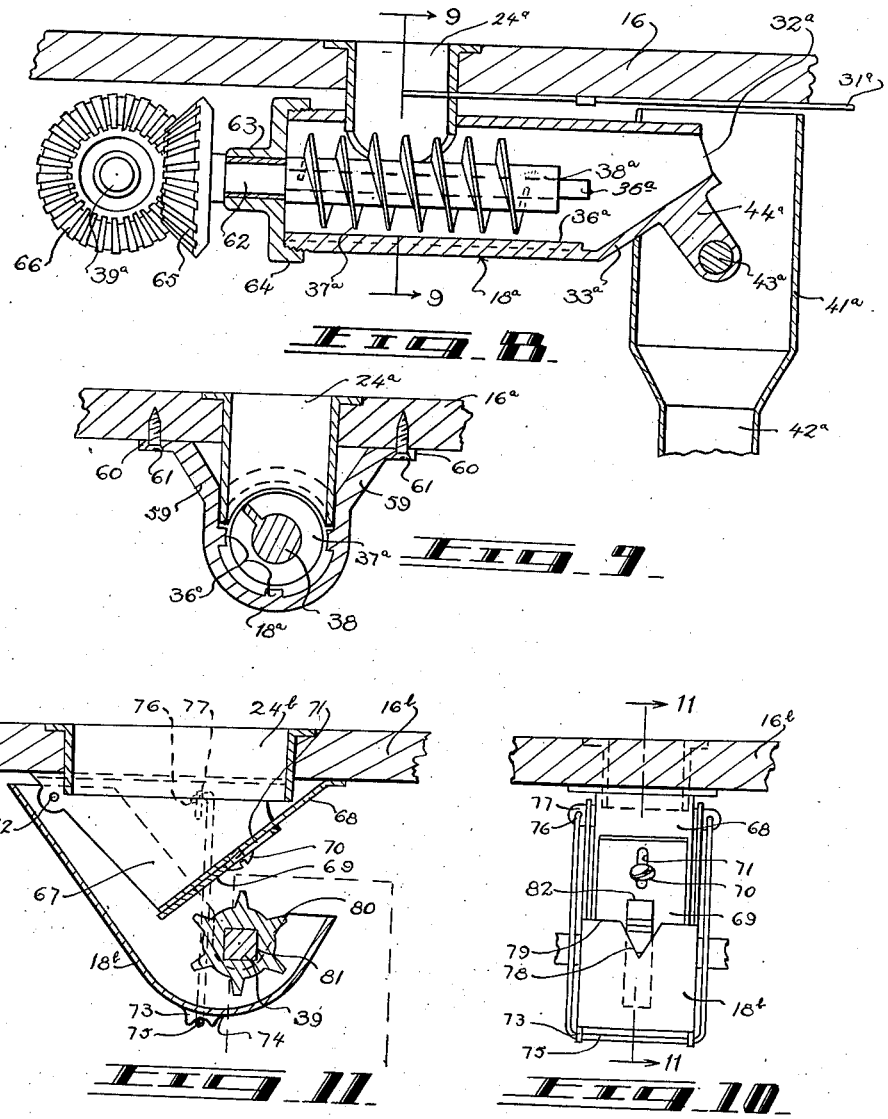

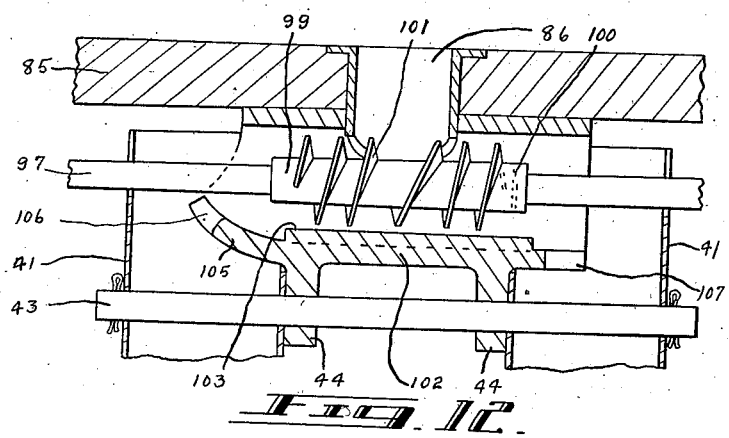
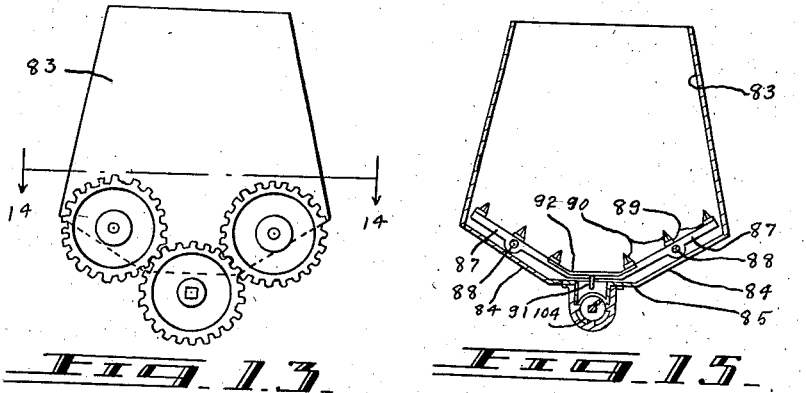
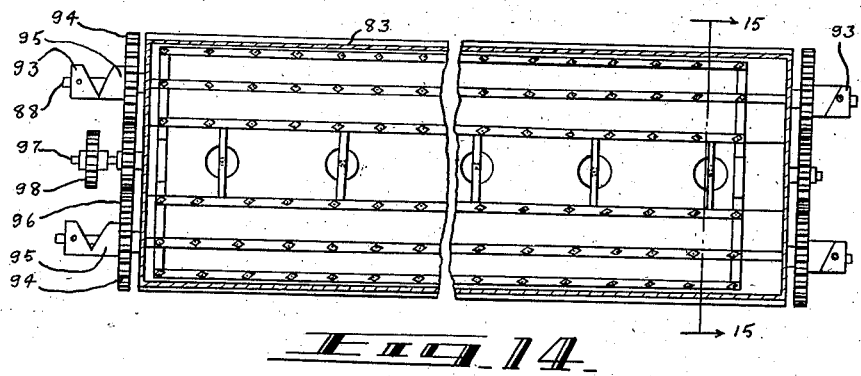

Patented Feb. 16, 1937

2,071,037

UNITED STATES PATENT OFFICE 2,071,037

FERTILIZER AND SEED FEED ATTACHMENT FOR DRILLS

Harold Jesse Kemp, Swift Current, Saskatchewan, Canada

Application May 7, 1932, Serial No. 609,879

2 Claims. (Cl. 221—129)

This present invention relates to certain new and useful improvements in a fertilizer and seed feed attachment for a drill.

The invention has for its primary object the provision of a fertilizer and seed feed attachment for a drill which is of improved and simplified construction and operation and highly efficient in use.

The invention has for another object the provision of a fertilizer and seed feed attachment for a drill which may be readily applied to or incorporated in a drill of conventional form now in general use, at small cost to assure proper feeding of a commercial fertilizer or seeds into drills during planting.

The invention has for a further object the provision of a fertilizer and seed feed attachment for a drill which will serve to automatically feed either the fertilizer or the seed separately or automatically feed the fertilizer and the seed together to the drill tubes, as predetermined by the operator.

The invention has for a still further object the provision of a fertilizer and seed feed attachment for a drill of the character stated which is automatic and positive in its operation to provide for an automatic forced feeding of the fertilizer or seed separately or both together into the several drill tubes.

The invention has for a still further object the provision of a fertilizer and seed feed attachment for a drill which may be readily mounted on the drill for feeding fertilizer in connection with the feeding of the seed from the feed hopper and thus assuring an automatic predetermined forced feeding of the fertilizer from the fertilizer hopper of the attachment to the drill tubes of the drill, without requiring extensive alterations in the drill.

The invention has for a still further object the provision of a fertilizer and seed feed attachment for a drill of the character stated which may be manufactured at small cost and retailed at a popular price with good profit, thus providing a commercially attractive proposition.

To the accomplishment of these and related objects as shall become apparent as the description proceeds, the invention resides in the construction, combination and arrangement of parts as shall be hereinafter more fully described, illustrated in the accompanying drawings and pointed out in the claims hereunto appended.

The invention will be best understood and can be more clearly described when reference is had to the drawings forming a part of this disclosure, wherein like characters indicate like parts throughout the several views.

In the drawings:—

Figure 5 is a fragmentary vertical transverse section, taken substantially on the plane of line 5—5 of Figure 3, looking in the direction indicated by the arrows;

Figure 6 is a horizontal section, taken substantially on the plane of line 6—6 of Figure 5, looking in the direction indicated by the arrows;

Figure 7 is a detail vertical section, taken substantially on the plane of line 7—7 of Figure 5, looking in the direction indicated by the arrows;

Figure 8 is a view similar to Figure 5, showing a modified form of the invention;

Figure 9 is a vertical section through the structure shown in Figure 8 and taken substantially on the plane of line 9—9 of Figure 8, looking in the direction indicated by the arrows;

Figure 10 is a rear elevation of a further modified form of the invention;

Figure 11 is a vertical section through the structure shown in Figure 10 and taken substantially on the plane of line 11—11 of Figure 10, looking in the direction indicated by the arrows;

Figure 12 is a view similar to Figure 5, showing a still further modified form of the invention;

Figure 13 is a side elevation of the form of the invention shown in Figure 12;

Figure 14 is a horizontal section taken on the plane of line 14—14 of Figure 13, looking in the direction indicated by the arrows; and Figure 15 is a vertical section, taken on the plane of line 15—15 of Figure 14, looking in the direction indicated by the arrows.

Figure 1:
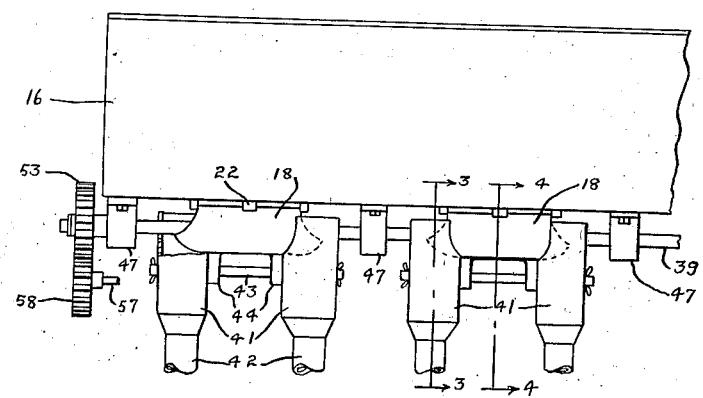
Figure 1 is a fragmentary rear elevation of the fertilizer and seed feed attachment for a drill.
Figure 2:
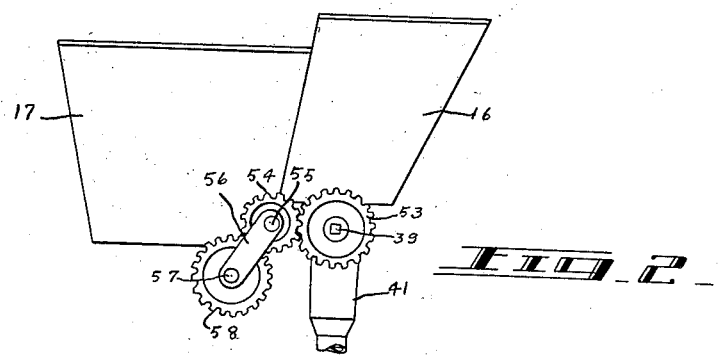
Figure 2 is a side elevation thereof, taken at right angles to Figure 1.
Figure 3:
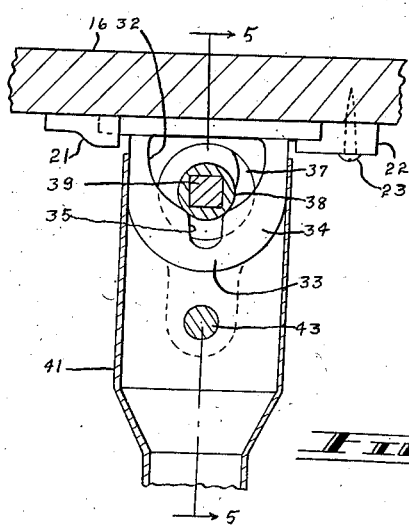
Figure 3 is an enlarged detail section, taken substantially on the plane of line 3—3 of Figure 1, looking in the direction indicated by the arrows.
Figure 4:
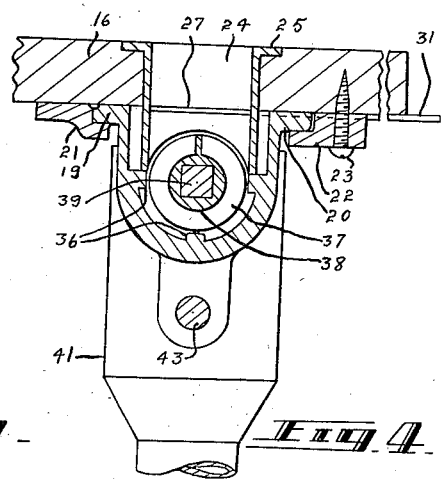
Figure 4 is an enlarged detail section, taken substantially on the plane of line 4—4 of Figure 1, looking in the direction indicated by the arrows.

Referring more in detail to the drawings, it is to be noted that the attachment includes a fertilizer hopper 16 which is suitably secured against the regular seed hopper 17, preferably against the rear side thereof with the bottom of the fertilizer hopper 16 in a plane above the horizontal plane occupied by the bottom of the seed hopper 17. Supported on the underside of the fertilizer hopper bottom at spaced intervals are the transverse force feed screw troughs 18, each of which has a pair of outturned flanges 19 and 20 along its opposite upper longitudinal edges with the flange 19 resting in an elongated suspending bracket plate 21 secured rigidly on the underface of the fertilizer hopper bottom. The opposite flange 20 is supported by a plurality of small clamping plates 22 which are removably secured to the underface of the fertilizer hopper bottom by screws 23 or other appropriate means. Depending through the bottom of the fertilizer hopper 16 and extending downwardly through the upper side of the trough 18, at the centre thereof, is an open end thimble 24 supported in position by an outturned annular flange 25 at its upper edge countersunk in the upper face of the fertilizer hopper bottom around the opening 26 therein through which the thimble 24 extends. The thimble 24 has a transverse slot 27 provided therein through which operates the main circular portion of a slide cutoff plate valve 28 which operates against the underface of the bottom of the fertilizer hopper 16 and has a tangential extension 29 on one side or edge of the main portion 28 thereof which is mounted on a fulcrum member 30 extended into the upper side of the trough 18 or the underside of the fertilizer hopper bottom, as desired. An elongated handle 31 is extended from the opposite side or edge of the main circular portion of the slide cutoff plate valve 28 to provide for ready operation of the slide cutoff plate valve 28 and setting of the latter in proper position to regulate the dropping of the fertilizer from the fertilizer hopper 16 into the trough 18 or cut off the supply of fertilizer from the fertilizer hopper 16, as desired.

Each trough 18 has opposite open ends serving as discharge ends 32 with the bottom wall 33 curved upwardly and the side walls 34 also curved inwardly for a short distance, the discharge mouth or opening of each end 32 having a reduced lower portion 35 continued downwardly a short distance in the bottom wall 33, the purpose of which will presently appear. Arranged longitudinally on the inner face of each trough 18 are the opposite side ribs and bottom rib 36 to cooperate with the reverse force feed threads 37 of the feed screw member 38, the main portion or body portion of which is shown as being in the form of a sleeve having a squared central opening through which is extended the transverse square shaft 39, a pin 40 being extended transversely through the feed screw member 38 and through the square shaft 39 to secure the feed screw member 38 in set position longitudinally of the square shaft 39 with the meeting inner ends of the reverse force feed threads 37 at the centre of the feed screw member 38 directly beneath the centre of the thimble 24. As the transverse square shaft 39 is rotated in the proper direction, the fertilizer dropping from the fertilizer hopper 16 by way of the thimble 24 onto the centre of the feed screw member 38 will be fed thereby to and forced out of the opposite discharge ends 32 of the trough 18 and into the enlarged upper ends 41 of the fertilizer feed tubes 42 to be carried and fed by the latter to the drill tubes of the drill. The pair of fertilizer feed tubes 42 are suspended on the opposite ends of a rod 43 extended transversely through the enlarged upper ends 41 of the fertilizer feed tubes 42, the rod 43 having its central portion extended transversely through the pair of depending lugs 44 carried on the underside of the trough 18. The fertilizer feed tubes 42 have openings 45 provided in the opposed sides of the enlarged upper ends 41 thereof to accommodate the opposite ends of the trough 18 extended into said enlarged upper ends 41 of the fertilizer feed tubes 42 and said enlarged upper ends 41 of the fertilizer feed tubes 42 are held against the outer faces of the depending lugs 44 by cotter pins 46 extended through the opposite ends of the rod 43 outwardly of the fertilizer feed tubes 42 or by other appropriate means, thus assuring delivery of all of the fertilizer discharged from the opposite ends of the trough 18 into the fertilizer feed tubes 42. The transverse square shaft 39 is supported beneath the fertilizer hopper 16 by a series of appropriate bearings 47 secured to the underface of the fertilizer hopper 16. Each bearing 47 is shown as including a stationary bearing bracket 48 within which is carried a bearing sleeve 49 encircling the bearing member 50 carried on the transverse square shaft 39 and rotating therein. A pair of washers or discs 51 are provided on the transverse square shaft 39 of larger diameter than the bearing sleeve 49 and held against the ends thereof and the opposite sides of the bearing bracket 48 by cotter pins 52 extended transversely through the transverse square shaft 39 or by other suitable means, to prevent longitudinal movement of the transverse square shaft 39. It will thus be seen that the transverse square shaft 39 serves as the operating shaft for a series of force feed screw members 38 providing a forced feed in opposite directions of fertilizer from the fertilizer hopper 16 to a series of pairs of fertilizer feed tubes 42. The transverse square shaft 39 has a gear wheel 53 provided on one extended end driven by an intermediate idler gear 54 carried on a stub shaft 55 projecting laterally from one end of a link 56 having its opposite end fulcrumed on the driving shaft 57 carrying the driving gear 58 meshing with and operating the gear wheel 54. This driving shaft 57 may be driven from any suitable source of power provided on the drill planter.

In the modified form of the invention, disclosed in Figures 8 and 9, the trough 18a has only one open or discharge end 32a with the bottom wall 33a thereof inclined and a single inclined depending lug 44a through which the transverse rod 43a is extended for supporting a single fertilizer feed tube 42a into the side of the enlarged upper end 41a of which is extended the discharge end 32a of the trough 18a and the lug 44a. Consequently the feed screw member 38a in the trough 18a has only a single spiral thread 37a thereon with the thimble 24a depending through the bottom of the fertilizer hopper 16a discharging onto the central portion of the spiral thread 37a of the screw feed member 38a. The spiral thread 37a of the feed screw member 38a cooperates with the longitudinal side ribs and the longitudinal bottom rib 36a in the main portion of the trough 18a to assure a forced feeding of the fertilizer to and discharge of the same from the open end or discharge end 32a of the trough 18a. The trough 18a has on its main portion a pair of upstanding and diverging side lugs 59 with outturned upper ends 60 secured on the underface of the fertilizer hopper bottom by appropriate securing means such as the screws 61. The feed screw member 38a is carried on a stub shaft 62 rotatable through the flanged centre 63 of the cap 64 threaded on the second end of the trough 18a, a gear wheel 65 being provided on the stub shaft 62 and engaged with and driven by a gear wheel 66 carried on the transverse shaft 39a supported in an appropriate manner beneath the fertilizer hopper 16a and in this form corresponding to the transverse square shaft 39 provided in the preferred form of the invention. It is therefore apparent that in this second or modified form of the invention, the trough 18a, the feed screw member 38a, thimble 24a and all parts cooperating with the parts are duplicated for each fertilizer feed tube 42a leading to each drill tube of the agricultural implement, although the forced feeding of the fertilizer to all of the fertilizer feed tubes 42 is operated and controlled from a single transverse shaft 39a beneath the fertilizer hopper 16a.

In the further modified form of the invention disclosed in Figures 10 and 11, the thimble 24b is altered in construction, being in this form of substantially rectangular formation in plan and reduced in depth. Furthermore, the thimble 24b delivers the fertilizer from the fertilizer hopper 16b into a narrow substantially triangular chute 67 which has one side open below the fertilizer hopper bottom to the underside of which the chute 67 is attached, the other inclined side 68 of the chute 67 being closed and provided with a slide valve plate 69 adjustable longitudinally on its underface and secured in adjusted position by a set screw 70 extending through an elongated slot 71 in said slide valve plate 69 and secured in the inclined bottom of said inclined closed slide 68 of the chute 67. In this third form of the invention, the trough 18b is of a narrow inclined character with its open upper end mounted on the pivot member 72 extended transversely through the chute 67 at the upper corner of the open inclined side thereof. The upper inclined side of the chute 18b is open to accommodate the open inclined side of the chute 67 extended into said trough 18b. Notched lugs 73 are provided on the underface of the trough 18b at the rounded lower end 74 thereof and receives the bight portion of a substantially U-shaped retaining member 75, the upper hook ends 76 of which are detachably engaged in eyes 77 projecting laterally from the sides of the chute 67, near the centre of the upper edge thereof, to thus retain the trough 18b in its functioning position. The rounded lower end 74 of the trough 18b extends beneath the closed inclined side 68 of the chute 67 and the slide valve plate 69 thereon and is turned upwardly with a substantially V-shaped discharge opening 78 provided centrally in the upturned free end 79 of said trough 18b. Recesses 80 are also provided in the sides of the rounded end 74 of the trough 18b to receive the transverse square shaft 81 suitably supported beneath the bottom of the fertilizer hopper 16b and a star-shaped fertilizer forced feed wheel 82 is carried on the transverse square shaft 81 in such a position as to be accommodated in the rounded lower end 74 of the trough 18b and force feeding or discharging of the fertilizer from the trough 18b by way of the substantially V-shaped discharge opening 78 in the upturned free end 79 of the trough 18b, when the transverse square shaft 81 is rotated in the proper direction. When the trough 18b is maintained in its normal or functioning position by the substantially U-shaped retaining member 75, the star wheel 82 operating therein will discharge the fertilizer from the trough 18b into the enlarged upper end 41b of a fertilizer feed tube into which the upturned end of the trough 18b extends or into any other receiving device, as desired. It is also apparent that feeding of the fertilizer from the fertilizer hopper 16b by way of the thimble 24b and chute 67 to the rounded lower end 74 of the trough 18b for discharge therefrom by the star wheel 82 may be readily regulated by proper adjustment of the slide valve plate 69 and the latter firmly secured in its adjusted position. Whenever it is desired, the retaining member 75 may be removed and the trough 18b swung downwardly on its pivot member 72 for the purpose of inspection or cleaning.

In the form of the invention disclosed in Figures 12 to 15 inclusive the hopper 83 has its sides flared downwardly or diverged and meet at their lower edges the inclined side portions 84 of the bottom 85, the longitudinal central portion only of the hopper bottom 85 being in a horizontal plane. In this central portion of the hopper bottom 85 are positioned at spaced intervals the open end thimbles 86 which depend therethrough. This construction of hopper tends to prevent packing of the material therein toward the bottom of the hopper. A pair of agitators 87 are mounted on side shafts 88 extending longitudinally over the inclined side portions 84 of the hopper bottom 85 and projecting through the ends of the hopper. These agitators 87 include spaced longitudinal bars 89 on which are arranged at spaced intervals the upstanding conical agitator teeth 90 which serve to agitate the material in the bottom of the hopper and work the same toward the flat or horizontal longitudinal central portion of the hopper bottom 85, as the agitators 87 are operated, so that the material may readily reach and drop through the open end thimbles 86. To keep the openings through the thimbles 86 or the bores thereof clear at all times, clearing pins 91 depend into the same from cross bars 92 connecting the opposite lower edges of the agitators 87. The agitators 87 are rigid on their respective side shafts 88 and each side shaft 88 in turn has rigidly mounted on its outer extremities cam members 93. Loosely or rotatably mounted on each end of the side shafts 88, between the rigid cam member 93 and the adjacent end of the hopper 83, is a gear wheel 94 having a concentric hub cam member 95 on its face opposed to the rigid cam member 93. Positioned intermediate the pair of gear wheels 94 at either end of the hopper 83 and meshing therewith is a driving gear wheel 96 on a stub shaft 97, which latter carries a gear wheel 98 to provide for driving the square shaft 97 and the gear wheel 96 by appropriate driving means. It will thus be seen that when the gear wheels 94 are operated by the gear wheel 96, the hub cam members 95 carried by the gear wheels 94 will operate against the rigid cam members 93 to cause reciprocation of the shafts 88 and the agitators 87 carried thereon, within the hopper 83.

The shaft 97 extends longitudinally beneath the hopper 83 and appropriately fastened on the shaft 97 beneath each open thimble 86 is a screw feed member 99, preferably fastened in position by a pin 100 or the like. The feed screw member 99 has a spiral feed screw 101 thereon with the central spirals or turns spaced further apart just under the centre of the open end thimble 86. Each screw feed member 99 is centrally positioned in a forced feed screw trough 102 concentrically surrounding a portion of the squared shaft 97 and secured by its upper side to the underface of the hopper bottom 85 with the lower end of the open end thimble 86 depending through the upper side of the forced feed screw trough 102. This forced feed screw trough 102 has longitudinal ribs 103 on its inner face at the bottom and sides thereof, thereby providing lower pockets or runways 104 which make it possible to sow large seeds such as peas without danger of cracking them by the spiral feed screw 101. The forced feed screw trough 102 has one end 105 of its bottom curved upwardly and then provided with a central recess 106 for discharging fertilizer, feed or other material into the enlarged upper end 41 of a fertilizer feed tube supported on a rod 43, which latter is extended transversely therethrough and through a pair of depending lugs 44 carried on the underside of the forced feed screw trough 102. The opposite end of the forced feed screw trough 102 is cut off square and has a substantially V-shaped opening 107 in its bottom to permit the material to flow uniformly from the trough 102 into the enlarged upper end 41 of the other fertilizer feed tube supported on the second or remaining end of the rod 42. It is thus apparent that the single worm-type of feed screw 101 with the ends different would afford two kinds of outlets when facilities are provided to reverse the direction of the worm or spiral feed screw 101.

The screw feed member 99, the housing trough 102 therefor and the squared shaft 97 may extend longitudinally beneath the hopper 83 as illustrated or may be positioned transversely therebeneath as preferred. Also, a separate shaft 97 may be provided for each screw feed member 99.

As the construction of the device has thus been described in detail, brief reference is now had to its use and modus operandi: In each of the forms disclosed herein, the fertilizer is discharged from the fertilizer hopper 16, 16a, 16b or 83 as the case may be and delivered by a force feed at a predetermined rate through an appropriate trough to the fertilizer feed tubes in pairs or separately for delivery to the drill tubes of the drill seeder or planter to which the device is attached. All of the parts of the invention are constructed and arranged so that the complete attachment may be readily mounted on the conventional seed drill or planter without requiring alterations in the construction thereof and as the feeding of the fertilizer from the fertilizer hopper is automatic and the quantity of fertilizer passing through the trough may be readily regulated by proper adjustment of the control valve provided for this purpose between the fertilizer hopper and automatic force feed mechanism, delivery of the proper amount of fertilizer to the drills is assured at all times.

From the foregoing description taken in connection with the accompanying drawings, it will be manifest that a fertilizer and seed attachment for a drill is provided that will fulfill all the necessary requirements of such a device but as many changes could be made in the above description and many apparently widely different embodiments of the invention may be constructed within the scope of the appended claims without departing from the spirit or scope thereof, it is intended that all matters contained in the said accompanying specification and drawings, shall be interpreted as illustrative and not in a limitative or restrictive sense.

Having thus described the invention, what is claimed is:—

1. A fertilizer and seed feed attachment for a drill including a fertilizer hopper; a trough with an open discharge end curved upwardly at the bottom and inwardly at the sides, and a reduced lower portion of the opening continuing downwardly a short distance in the bottom wall; bottom and side longitudinal ribs formed interiorly in said trough, an opening in the top of said trough permitting communication with said hopper, an outwardly directed flange along each side of said trough at the top thereof, a longitudinal indented bracket secured to the underside of said hopper for removably receiving one of said flanges, and a plurality of clamping plates spaced along the opposite side of said trough pivotally supported by a screw and having an offset tongue on the lower end adapted to underlie the adjacent flange; and a force feed auger operable in said trough and on said ribs expelling fertilizer from the open end of said trough.

2. A fertilizer and seed feed attachment for a drill including a fertilizer hopper; a trough, with open discharge ends that are each curved upwardly at the bottom and have a reduced lower portion of the opening continued downwardly a short distance in the bottom wall, associated with said hopper; and mechanism operable in said trough to automatically feed the fertilizer to a fertilizer receiving tube on said drill.

HAROLD JESSE KEMP.